(12) United States Patent
Inoue (10) Patent No.: US 9,963,184 B2
(45) Date of Patent: May 8, 2018

(54) ELECTRIC VEHICLE (71) Applicant: KAWASAKI JUKOGYO KABUSHIKI KAISHA, Kobe-shi, Hyogo (JP)

(72) Inventor: Masafumi Inoue, Miki (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 21 days.

(21) Appl. No.: 14/654,637

(22) PCT Filed: Dec. 25, 2012

(86) PCT No.: PCT/JP2012/008231
§ 371 (c)(1),
(2) Date: Jun. 22, 2015

(87) PCT Pub. No.: WO2014/102847
PCT Pub. Date: Jul. 3, 2014

(65) Prior Publication Data
US 2015/0344093 A1    Dec. 3, 2015

(51) Int. Cl.
*B62K 11/04* (2006.01)
*B62M 7/04* (2006.01)

(52) U.S. Cl.
CPC ............ *B62K 11/04* (2013.01); *B62M 7/04* (2013.01); *B62K 2204/00* (2013.01); *B62K 2208/00* (2013.01)

(58) Field of Classification Search
CPC .......... B62K 7/04; B62K 11/00; B62K 11/02; B62K 11/04; B62K 2204/00; B62K 2208/00; B62M 7/04
See application file for complete search history.

(56) References Cited

U.S. PATENT DOCUMENTS 6,176,338 B1    1/2001  Nakagawa et al.
9,308,966 B2 *  4/2016  Kosuge ................. B62K 11/04
(Continued)

FOREIGN PATENT DOCUMENTS

JP    2003157819 A    5/2003
JP    2007083953 A    4/2007
(Continued)

OTHER PUBLICATIONS

ISA Japanese Patent Office, International Search Report Issued in Application No. PCT/JP2012/008231, dated Apr. 9, 2013, WIPO, 2 pages.
(Continued)

*Primary Examiner* — Joseph M Rocca
*Assistant Examiner* — Maurice L Williams
(74) *Attorney, Agent, or Firm* — Alleman Hall Creasman & Tuttle LLP (57) ABSTRACT

An electric vehicle comprises a vehicle body including a head pipe supporting a steering shaft, and a main frame extending rearward from the head pipe; an electric motor which generates driving power for driving a wheel; and a battery case accommodating a plurality of batteries storing DC power to be supplied to the electric motor, in a battery space in an interior of the battery case, wherein the battery case includes a casing body, and a reinforcement frame provided on the casing body to reinforce the main frame, and the reinforcement frame is fastened to the main frame by a fastening member.

13 Claims, 8 Drawing Sheets

(56) References Cited

U.S. PATENT DOCUMENTS

| | | | |
|---|---|---|---|
| 2005/0092538 A1 | 5/2005 | Baldwin et al. | |
| 2011/0032065 A1* | 2/2011 | Raczkowski | H01F 27/2804 336/200 |
| 2012/0097463 A1* | 4/2012 | Iwata | B60K 1/00 180/65.1 |
| 2012/0103706 A1* | 5/2012 | Kondo | B62M 7/12 180/65.1 |
| 2012/0103710 A1* | 5/2012 | Atsuchi | B60K 1/04 180/65.31 |
| 2012/0103716 A1* | 5/2012 | Fujihara | B60L 11/1877 180/220 |
| 2012/0241241 A1* | 9/2012 | Takamura | B62K 11/04 180/335 |
| 2013/0270022 A1* | 10/2013 | Matsuda | B62K 11/04 180/220 |
| 2015/0329175 A1* | 11/2015 | Inoue | B60K 1/04 307/10.1 |
| 2015/0329176 A1* | 11/2015 | Inoue | B62K 19/30 180/220 |

FOREIGN PATENT DOCUMENTS

| | | | | |
|---|---|---|---|---|
| JP | 2007509813 A | 4/2007 | | |
| JP | 2012091595 A | 5/2012 | | |
| JP | 2012186893 A | 9/2012 | | |
| WO | WO 2012043562 A1 * | 4/2012 | | B62M 7/12 |

OTHER PUBLICATIONS

European Patent Office, Extended European Search Report Issued in Application No. 12891055.1, dated Jan. 31, 2017, Germany, 10 pages.

* cited by examiner

ELECTRIC VEHICLE

TECHNICAL FIELD

The present invention relates to an electric vehicle which drives a wheel with driving power generated in an electric motor.

BACKGROUND ART

In recent years, an electric vehicle which drives a wheel with driving power generated in an electric motor using electric power supplied from batteries has been developed. Patent Literature 1 discloses an electric motorcycle as an exemplary electric vehicle. In this electric motorcycle, batteries accommodated in a battery case are placed above a rear frame and below a seat.

CITATION LIST

Patent Literature

Patent Literature 1: Japanese Laid-Open Patent Application Publication No. 2012-186893

SUMMARY OF INVENTION

Technical Problem

In order to increase the cruising distance of the vehicle, it is necessary to increase the batteries in size. However, in the above configuration, the batteries with a heavy weight are supported on the rear frame or a frame in the vicinity of the seat. If an attempt is made to attain a sufficient stiffness to support the batteries stably, the structure of a vehicle body may become complex, and the size and weight of the vehicle body may be increased.

Accordingly, an object of the present invention is to support the batteries stably while allowing the vehicle body to have a simplified structure.

Solution to Problem

The present invention provides an electric vehicle comprising a vehicle body including a head pipe supporting a steering shaft, and a main frame extending rearward from the head pipe; an electric motor which generates driving power for driving a wheel; and a battery case accommodating a plurality of batteries storing DC power to be supplied to the electric motor, in a battery space in an interior of the battery case, wherein the battery case includes a casing body, and a reinforcement frame provided on the casing body to reinforce the main frame, and wherein the reinforcement frame is fastened to the main frame by a fastening member.

In accordance with this configuration, since the reinforcement frame provided on the casing body of the battery case is fastened to the main frame by the fastening member, the reinforcement frame of the battery case can be used as a stiff member of the main frame. This can reduce a stiffness required for the vehicle body. Even when the stiffness of the vehicle body is reduced, and the vehicle body is simplified in structure, the batteries can be supported stably.

The reinforcement frame may be provided on a bottom portion of the battery case, and at least one of the plurality of batteries may be supported by the reinforcement frame.

In accordance with this configuration, the reinforcement frame serves to support the batteries and reinforce the main frame. Since the load of the batteries which the casing body bears can be reduced, the stiffness of the casing body and the weight of the casing body can be reduced.

The battery case may be placed between a front wheel and a rear wheel in a forward and rearward direction, the reinforcement frame may extend in a forward and rearward direction, and a front end portion and a rear end portion of the reinforcement frame may be connected to the main frame.

In accordance with this configuration, the stiffness of the vehicle body in the forward and rearward direction can be increased by the reinforcement frame. Therefore, by reducing the stiffness of the main frame in the forward and rearward direction, the vehicle body can be simplified in structure.

The main frame may be divided into right and left main frames extending from the head pipe, and the reinforcement frame may include a pair of side members connected to the right and left main frames, respectively.

In accordance with this configuration, the right and left main frames can be increased in strength.

The reinforcement frame may include a cross member coupling the pair of side members to each other in a rightward and leftward direction.

In accordance with this configuration, in a case where the vehicle body includes the right and left main frames, the stiffness of the vehicle body in the rightward and leftward direction can be increased by the reinforcement frame.

The reinforcement frame may include a fastening unit fastened to the main frame, and the fastening unit may be provided at an outer side of the battery case in a vehicle width direction.

In accordance with this configuration, the battery case including the reinforcement frame can be easily mounted to the vehicle body.

The casing body may include a contact section configured to contact the reinforcement frame, and the contact section and the reinforcement frame may be made of metal.

In accordance with this configuration, the reinforcement frame can be easily welded to the casing body. A structure of the reinforcement frame and the casing body which are integrated can be easily realized.

The casing body may include a contact section configured to contact the reinforcement frame, the contact section and the reinforcement frame may be made of electrically conductive materials, and the contact section and the reinforcement frame may be set to an electric potential equal to an electric potential of a ground voltage of the plurality of batteries.

In accordance with this configuration, by merely connecting the negative terminal of the batteries to the reinforcement frame or the contact section, ground connection can be realized.

A portion of the casing body which is different from the contact section may be made of a resin.

In accordance with this configuration, the casing body can be reduced in weight while realizing the structure of the reinforcement frame and the casing body which are integrated.

The electric vehicle may further comprise a motor case accommodating the electric motor, the reinforcement frame may be provided with a hanger bracket protruding downward, and the motor case may be suspended from the hanger bracket.

In accordance with this configuration, since the reinforcement frame of the battery case suspends and supports the motor case, it is not necessary to directly couple the main frame to the motor case. Therefore, the main frame can be laid out more flexibly.

Advantageous Effects of Invention

As should be appreciated from the above, in accordance with the present invention, it becomes possible to stably support the batteries with a heavy weight while allowing the vehicle body to have a simplified structure.

DESCRIPTION OF EMBODIMENTS

Figure 1:
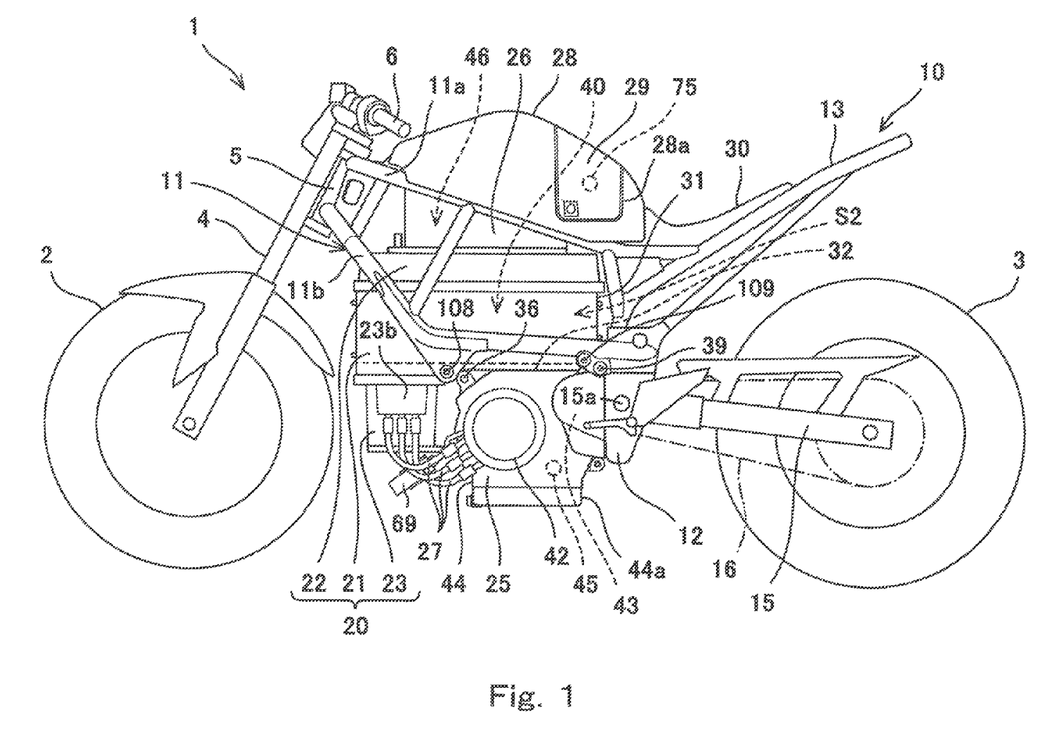
FIG. 1 is a left side view of an electric motorcycle according to an embodiment.

Hereinafter, the embodiment will be described with reference to the drawings. FIG. 1 is a left side view of an electric motorcycle 1 according to the embodiment of the present invention. As shown in FIG. 1, the electric motorcycle 1 which is a straddle-type vehicle includes a front wheel 2 which is a driven wheel, and a rear wheel 3 which is a drive wheel. The front wheel 2 is rotatably mounted to the lower end portion of a front fork 4. The upper portion of the front fork 4 is integrated with a steering shaft (not shown). The steering shaft is rotatably supported by a head pipe 5 of a vehicle body in a state in which the steering shaft is inserted into the head pipe 5. A handle 6 protruding in a rightward and leftward direction is attached to the steering shaft, and an accelerator grip (not shown) is provided at the right side of the handle 6.

Figure 3:
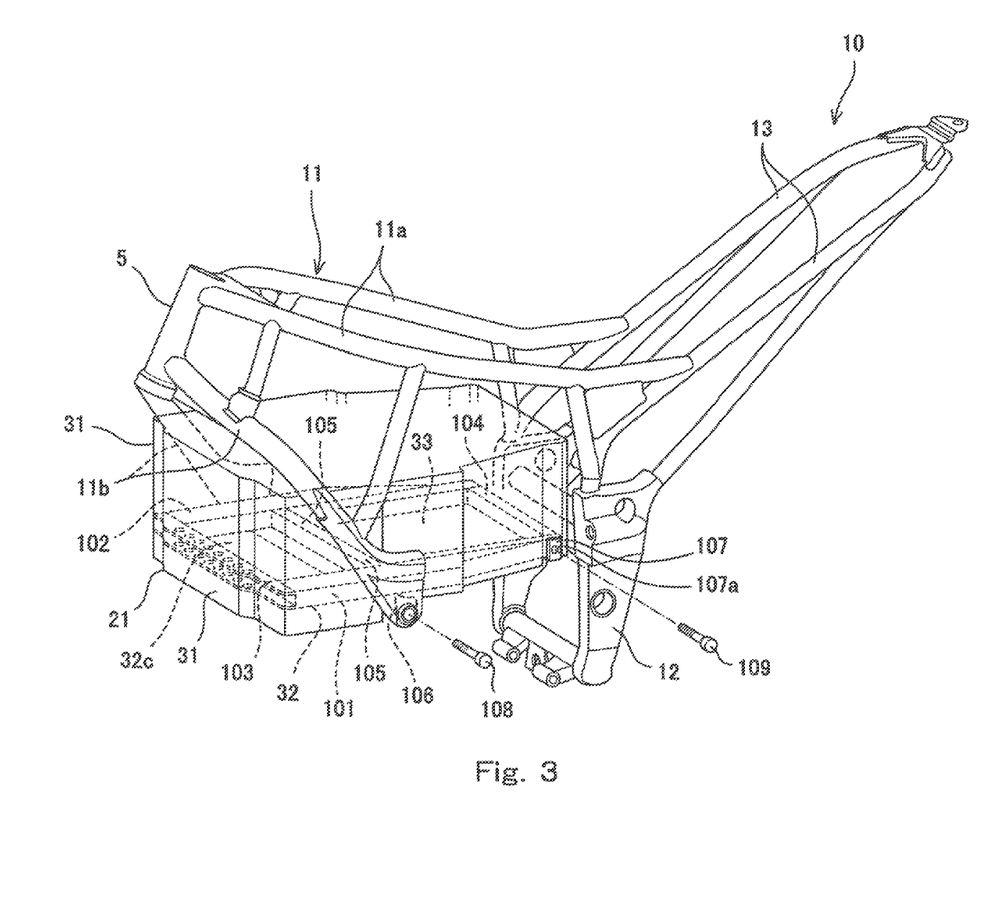
FIG. 3 is a perspective view of a vehicle body frame of the electric motorcycle of FIG. 1, when viewed from the left and front.

A vehicle body frame 10 includes the head pipe 5, and a main frame 11 extending rearward from the head pipe 5. The main frame 11 has a pair of upper and lower frames, which are an upper main frame 11a and a lower main frame 11b. Each of the upper main frame 11a and the lower main frame 11b includes a pair of right and left frames (the upper main frame 11a and the lower main frame 11b at a right side are shown in FIG. 3). The right and left upper main frames 11a extend rearward from the head pipe 5 such that they are inclined slightly downward. The right and left lower main frames 11b extend downward from the head pipe 5, then are bent, and extend rearward, in locations below the right and left upper main frames 11a, respectively. The rear end portions of the main frames 11 (the rear end portions of the right and left upper main frame 11a and the rear end portions of the right and left lower main frame 11b) are connected to a pivot frame 12 of a frame shape. The front end portion of a swing arm 15 is mounted to the pivot frame 12 such that the swing arm 15 supports the rear wheel 3 and is vertically pivotable. A rear frame 13 is placed above the swing arm 15. The rear frame 13 extends rearward from the rear end portions (in the present embodiment, the rear end portions of the right and left upper main frames 11a) of the main frames 11 or the upper portion of the pivot frame 12.

The vehicle body frame 10 supports a power unit 19. The power unit 19 includes a plurality of batteries 40, a motor unit 25 including an electric motor 42, an electric component group 46 including an inverter 47, and others which are integrated. The plurality of batteries 40 are accommodated into a battery case 20. The battery case 20 includes a middle case 21 which has a tubular shape in which upper and lower sides thereof are opened, and the lower end of a front region is opened, an upper case 22 attached to the middle case 21 to close the upper end opening of the middle case 21, and a lower case 23 attached to the middle case 21 to close a lower end opening 32c (see FIGS. 3 and 4) of the front portion of the middle case 21. These case members 21 to 23 are unitarily assembled to form a battery space S2 in which the batteries 40 are accommodated, in the interior of the battery case 20.

The middle case 21 includes a casing body 31 of a tubular shape, and a reinforcement frame 32 attached to the casing body 31. The reinforcement frame 32 supports at least a portion of the batteries 40 inside of the battery space S2. The reinforcement frame 32 supports the motor unit 25 such that the motor unit 25 is suspended. The reinforcement frame 32 is mounted to the lower main frames 11b by fastening members 108, 109 such as bolts or rivets. Thereby, the power unit 19 including the battery case 20 is supported on and fastened to the vehicle body frame 10. The reinforcement frame 32 is fastened to the lower main frames 11b to reinforce the lower main frames 11b (hence the entire main frames 11). In other words, the reinforcement frame 32 which is a portion of the battery case 20 also serves as a portion of the vehicle body frame 10.

Since the reinforcement frame 32 can reinforce the vehicle body frame 10, the stiffness required for the vehicle body frame 10 can be reduced. Therefore, the vehicle body frame 10 can be simplified in structure. Since the reinforcement frame 32 supports the batteries 40, the stiffness required for the case members 31, 22, 23 other than the reinforcement frame 32, of the battery case 20, can be reduced. This makes it possible to reduce the weight of the case members 31, 22, 23 of the battery case 20, in particular, the members which do not contact the reinforcement frame 32 (in the present embodiment, the upper case 22 and the lower case 23). Since the reinforcement frame 32 serves to bear a part of the load of the motor unit 25, the stiffness required for the vehicle body frame 10 or the case members 31, 22, 23 to support the motor unit 25 can be reduced. This makes it possible to further simplify the structure of the vehicle body frame 10 and the case members 31, 22, 23, and further reduce the weight of the vehicle body frame 10 and the case members 31, 22, 23.

Figure 2:
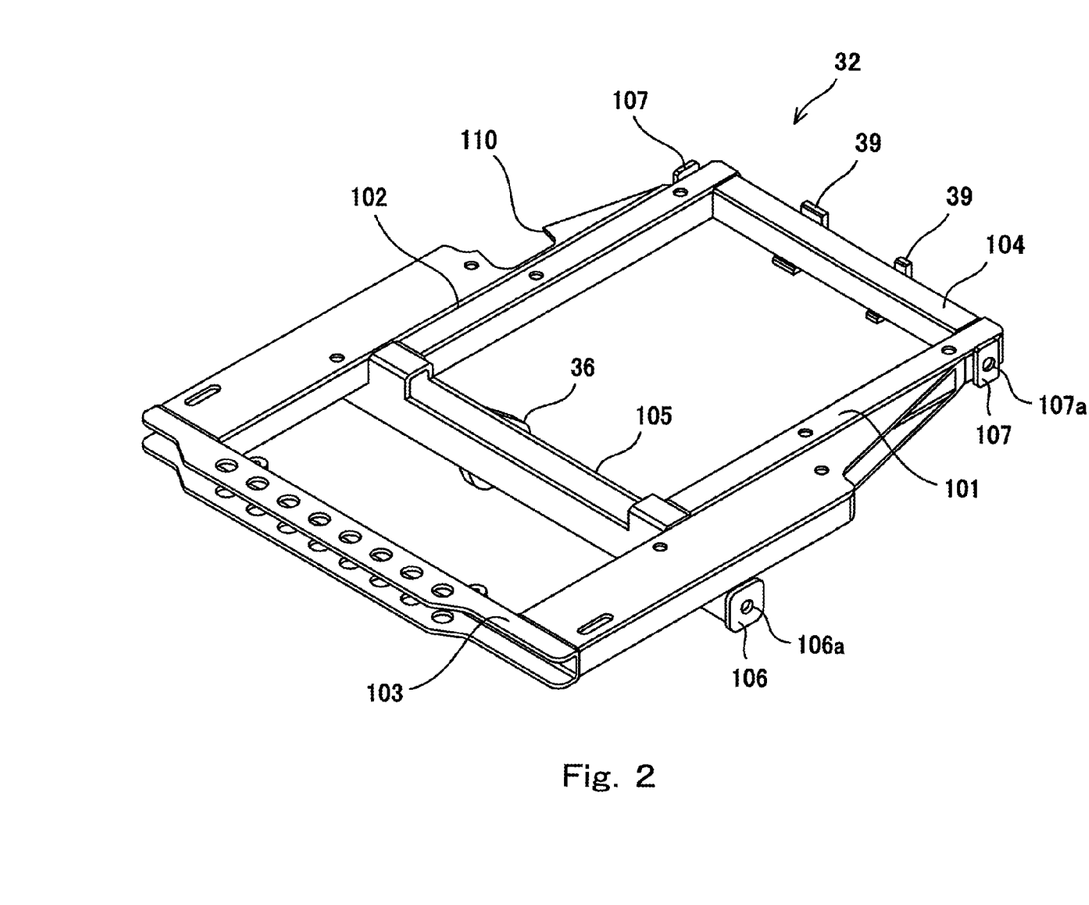
FIG. 2 is a perspective view of a reinforcement frame of the electric motorcycle of FIG. 1.

FIG. 2 is a perspective view of the reinforcement frame 32 of the electric motorcycle 1 of FIG. 1. As shown in FIG. 2, the reinforcement frame 32 as a whole has a rectangular frame shape, formed by welding or fastening and combining a plurality of elongated members with a hollow shape, a U-shape in cross-section, an H-shape in cross-section, or an L-shape in cross-section. The elongated members may be manufactured using a metal material such as steel or aluminum alloy.

The reinforcement frame 32 of the rectangular frame shape includes a pair of left and right side members 101, 102 extending in a forward and rearward direction, and a plurality of cross members 103 to 105 coupling the pair of side members 101, 102 in a rightward and leftward direction. The plurality of cross members 103 to 105 include the front cross member 103, the rear cross member 104 and the center cross member 105. These cross members 103 to 105 are placed to be spaced apart from each other in the forward and rearward direction such that they extend in the rightward and leftward direction. The front cross member 103 couples the front end portions of the side members 101, 102. The rear cross member 104 couples the rear end portions of the side members 101, 102. The center cross member 105 is placed between the cross members 103, 104 to couple the intermediate portions of the side members 101, 102.

Figure 5:
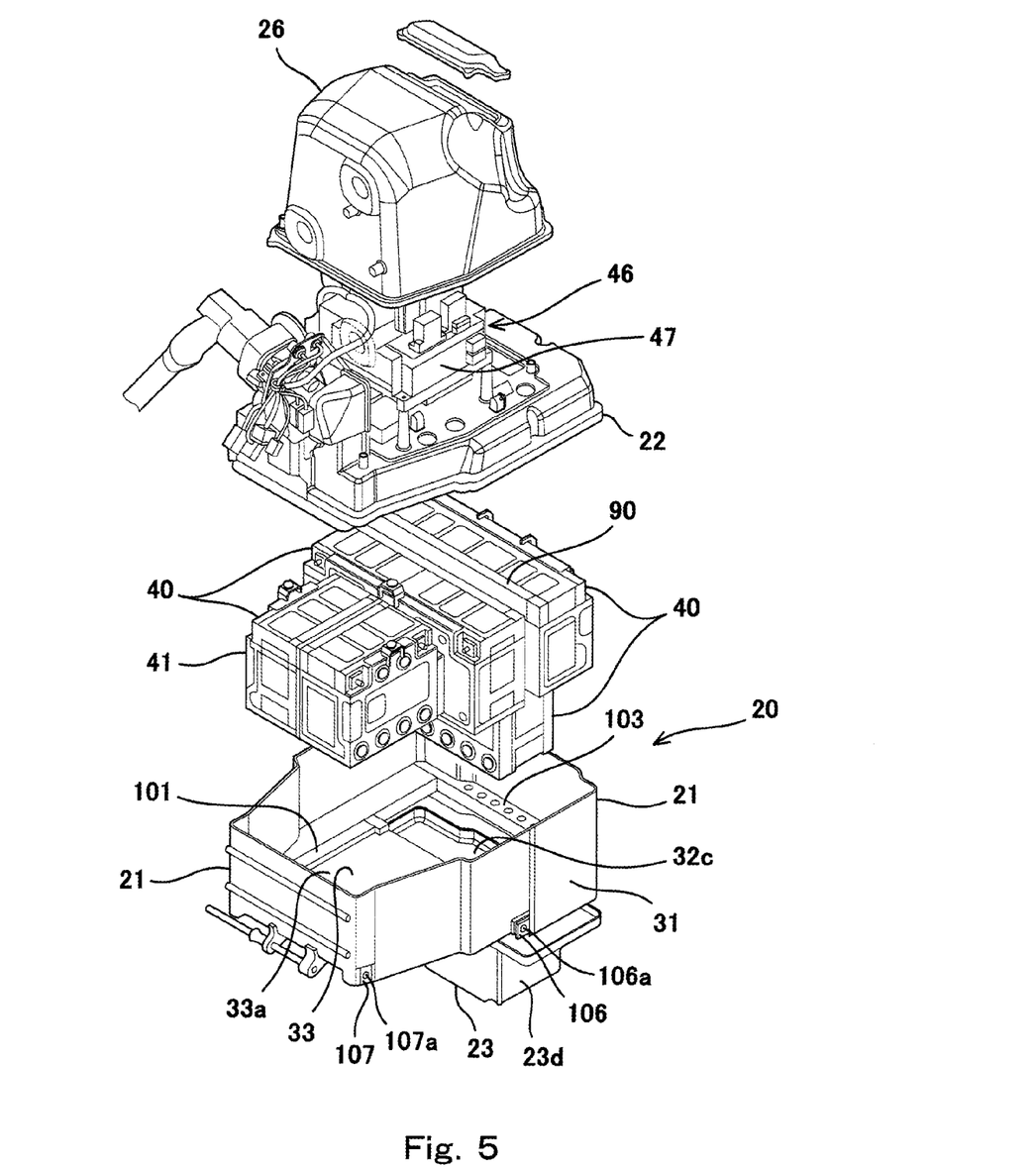
FIG. 5 is an exploded perspective view of the power unit (motor unit is not shown) of the electric motorcycle of FIG. 1, when viewed from the right and rear.

The reinforcement frame 32 includes fastening units 106, 107 fastened to the main frames 11 (see FIGS. 1 and 3). The fastening units 106, 107 are disposed to be spaced apart from each other in the forward and rearward direction. The fastening units 106, 107 include engagement holes 106a, 107a, with which the fastening members 108, 109 (see FIGS. 1 and 3) are engaged, respectively. The engagement holes 106a, 107a extend in the vehicle width direction, and are opened in the outer side surfaces of the reinforcement frame 32 in the vehicle width direction. Each of the front fastening unit 106 and the rear fastening unit 107 includes a pair of right and left fastening units (right front fastening unit is shown in FIG. 5). The four fastening units 106, 107 are provided at an outer side of the battery case 20 in the vehicle width direction.

In the illustrated example, the pair of front fastening units 106 are provided on the left end portion and right end portion of the center cross member 105, respectively. The center cross member 105 is mounted to the side members 101, 102 in a state in which the upper surfaces of the left end portion and right end portion of the center cross member 105 are in contact with the lower surfaces of the pair of side members 101, 102, respectively. For this reason, the pair of fastening units 106 are placed below the outer side surfaces of the side members 101, 102. The pair of rear fastening units 107 are provided on the rear end portions of the side members 101, 102, respectively and placed to overlap with the rear cross member 104 when viewed from a side. In other words, each of the rear cross member 104 and the center cross member 105 couples the side members 101, 102 in the rightward and leftward direction, the center cross member 105 couples the front fastening units 106 to each other in the rightward and leftward direction, and the rear cross member 104 couples the rear fastening units 107 to each other in the rightward and leftward direction. As a result, the portions of the reinforcement frame 32 (hence battery case 20) which are fastened to the vehicle body frame 10 (see FIGS. 1 and 3) are connected to each other in the rightward and leftward direction. Furthermore, in other words, the front fastening units 106 are mounted to the center portions of the lower surfaces of the left and right side members 101, 102, respectively, in the rightward and leftward direction, while the rear fastening units 107 are mounted to the rear end portions of the outer surfaces of the left and right side members 101, 102, respectively.

FIG. 3 is a perspective view of the vehicle body frame 10 of FIG. 1, when viewed from leftward and forward. In FIG. 3, portions of the lower main frames 11b, which extend in the forward and rearward direction are not shown, for easier illustration. As shown in FIG. 3, the casing body 31 has a rectangular tubular shape and is made of the same kind of metal as that of the reinforcement frame 32. The outer edge portions of the side members 101, 102, the outer edge portion of the front cross member 104, and the outer edge portion of the rear cross member 105 are in contact with the inner surface of the casing body 31. The side members 101, 102, the front cross member 104, and the rear cross member 105 are integrated with the casing body 31 of the middle case 21, by welding. Since the casing body 31 and the reinforcement frame 32 are made of the same kind of metal, the reinforcement frame 32 can be easily integrated with the casing body 31, by welding. In contrast, of the constituent members of the battery case 20, the upper case 22 (see FIG. 1) and the lower case 23 (see FIG. 1) do not contact the reinforcement frame 32, and are separate from the casing body 31 of the middle case 21. For this reason, the upper case 22 and the lower case 23 are made of a synthetic resin (e.g., polypropylene) with a smaller specific weight than that of the casing body 31 and the reinforcement frame 32. This allows the reinforcement frame 32 to be integrated with the casing body 31 while reducing the weight of the whole of the batteries 40.

The casing body 31 is welded to the reinforcement frame 32 in such a manner that the lower edge of the casing body 31 substantially conforms to the lower edges of the outer edge portions of the side members 101, 102, the lower edge of the front edge portion of the front cross member 103, and the lower edge of the rear edge portion of the rear cross member 104. As should be understood from this, the reinforcement frame 32 is basically accommodated into the casing body 31. The casing body 31 has a pair of hollow spaces formed by cutting, in the rear lower end portion of the left side surface and the rear end portion of the right side surface, respectively. In this structure, the pair of front fastening units 106 attached to the lower surfaces of the side members 101, 102, and the pair of rear fastening units 107 attached to the rear lower end portion of the left side surface of the side member 101 and to the rear lower end portion of the right side surface of the side member 102, do not overlap with the casing body 31 when viewed from a side, and define the external appearance of the middle case 21 (hence battery case 20) (see FIGS. 4 and 5 as well as FIG. 3).

In FIG. 3, for easier illustration, the upper case 22 (see FIGS. 4 and 5), the lower case 23 (see FIGS. 4 and 5), and the batteries 40 (see FIGS. 4 and 5) are not shown. The battery case 20 is mounted to the vehicle body frame 10 in a state in which the upper case 22, the lower case 23 and the batteries 40 are mounted to the middle case 21. At this time, the battery case 20 is placed between the pair of right and left main frames 11, and the fastening units 106, 107 are placed inward in the vehicle width direction relative to the main frames 11. When viewed from a side, the front fastening units 106 overlap with the bent portions of the lower main frames 11b (i.e., front end portions of the portions extending in the forward and rearward direction), and the rear fastening units 107 overlap with the rear end portions of the lower main frames 11b (i.e., rear end portions of the portions extending in the forward and rearward direction). The fastening members 108, 109 are inserted through the lower main frames 11b in the vehicle width direction, from locations that are outward in the vehicle width direction relative to the main frames 11, and into the engagement holes 106a, 107a, respectively. By disengaging the fastening members 108, 109 from the fastening units 106, 107, the battery case 20 supported on and fastened to the vehicle body frame 10 can be detached from the vehicle body frame 10.

In the above-described manner, the reinforcement frame 32 is detachably fastened to the main frames 11 by the fastening members 108, 109. The reinforcement frame 32 can be used as a stiff member of the main frames 11. This allows the reinforcement frame 32 to ensure a part of the stiffness required for the vehicle body frame 10. Therefore, the stiffness of the constituent members (especially, the main frames 11) of the vehicle body frame 10, which are other than the reinforcement frame 32, may be reduced. As a result, the vehicle body frame 10, for example, the main frames 11 can be simplified in structure.

In an alternative example of the present embodiment, only the front portions of the lower main frames 11b extending from the head pipes 5 to the portions fastened to the front fastening units 106 may be left, and the rear portions of the lower main frames 11b extending from the portions fastened to the front fastening units 106 to the portions connected to the pivot frame 12 may be omitted from the lower main frames 11b, although this is not shown. In this case, the rear fastening units 107 are fastened to the front portion of the pivot frame 12. In this structure, the reinforcement frame 32 constitutes a portion of the vehicle body frame 10, to connect the lower main frames 11b to the pivot frame 12. Therefore, the vehicle body frame 10 can be simplified in structure, and reduced in weight.

Figure 4:
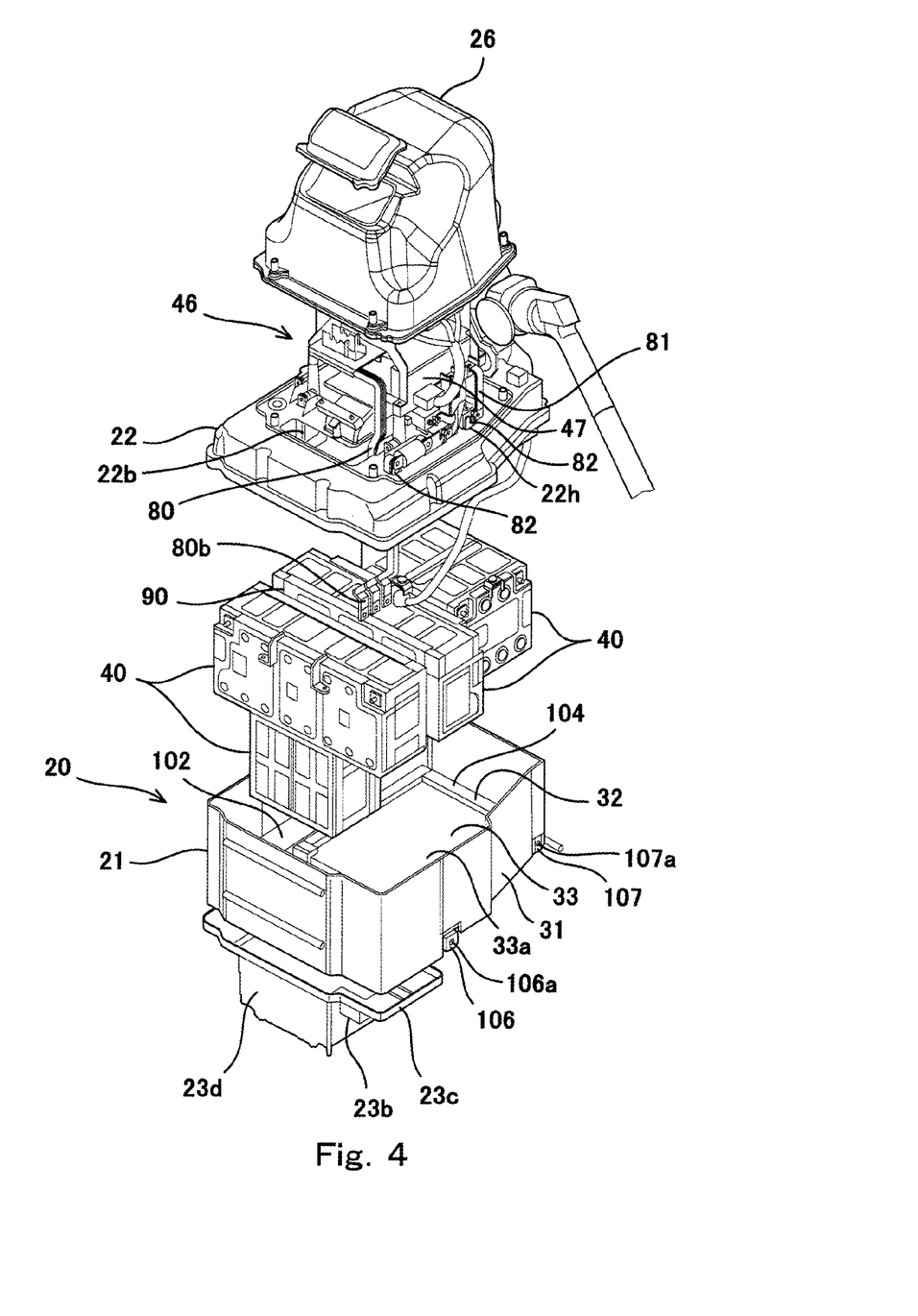
FIG. 4 is an exploded perspective view of a power unit (motor unit is not shown) of the electric motorcycle of FIG. 1, when viewed from the left and front.
Figure 6:
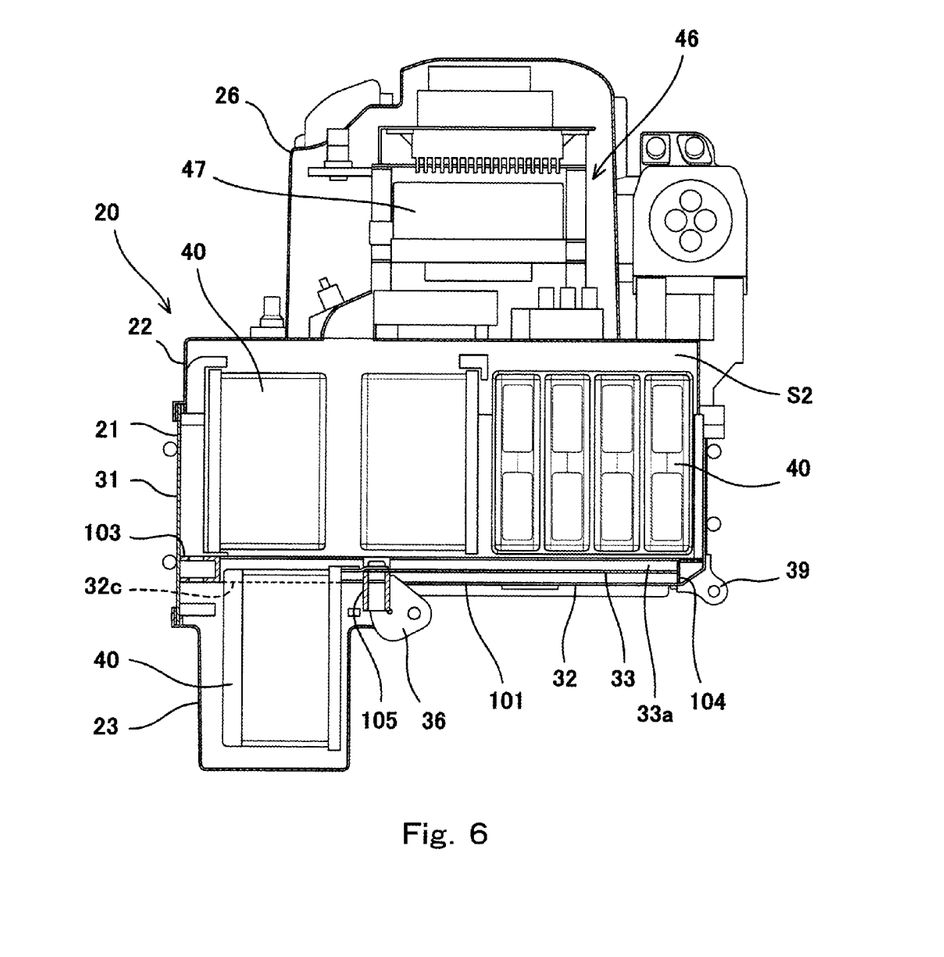
FIG. 6 is a longitudinal sectional view of the power unit (motor unit is not shown) of the electric motorcycle of FIG. 1, when viewed from the left.

FIG. 4 is an exploded perspective view of the power unit 19 (motor unit 25 is not shown) of the electric motorcycle 1 of FIG. 1, when viewed from the left and front. FIG. 5 is an exploded perspective view of the power unit 19 (motor unit 25 is not shown) of the electric motorcycle 1 of FIG. 1, when viewed from the right and rear. FIG. 6 is a longitudinal sectional view of the power unit 19 (motor unit 25 is not shown) of the electric motorcycle 1 of FIG. 1, when viewed from the left. As shown in FIGS. 4 to 6, the reinforcement frame 32 is provided on the bottom portion of the middle case 21. The upper surface of the reinforcement frame 32 defines the inner bottom surface of a frame shape, in the interior of the middle case 21. The rear region of the region of the middle case 21, which is surrounded by the reinforcement frame 32 and located behind the center cross member 105, is closed by a bottom plate 33 made of metal. The bottom plate 33 is made of the same kind of metal as that of the reinforcement frame 32. The reinforcement frame 32 and the bottom plate 33 are manufactured by ductile molding and/or weld-bonding. The bottom plate 33 is welded to the pair of side members 101, 102, the rear cross member 104, and the center cross member 105. In contrast, the front region of the region of the middle case 21, which is surrounded by the reinforcement frame 32 and located in front of the center cross member 105, is opened. In this structure, the lower end of the front region of the middle case 21 is formed with the above-described lower end opening 32c. The lower end opening 32c has a rectangular shape when viewed from above, depending on the shape of the reinforcement frame 32. The lower case 23 is attached to the middle case 21 to close the lower end opening 32c from below. The internal space of the middle case 21 is in communication with the internal space of the lower case 23 via the lower end opening 32c. In the present embodiment, the casing body 31, the reinforcement frame 32, and the bottom plate 33 are manufactured using materials, for example, the same kind of metal, which allow the casing body 31, the reinforcement frame 32, and the bottom plate 33 to be easily welded to each other. Therefore, the casing body 31, the reinforcement frame 32, and the bottom plate 33 can be easily integrated. The middle case 21 which is made of metal and has a complex shape, as a whole, can be easily manufactured.

The plurality of batteries 40 are integrated by a casing 41 as an assembly to form a battery group. The battery group is symmetric in the vehicle width direction. Each of the plurality of batteries 40 has a rectangular parallelepiped shape. The plurality of batteries 40 include two kinds of batteries which are different in long side dimensions, when viewed from above. Hereinafter, depending on the case, the batteries with a larger long side dimension will be referred to as "larger batteries", while the batteries with a smaller long side dimension will be referred to as "smaller batteries".

The battery group has an inverted-L shape when viewed from a side. The plurality of batteries 40 are aligned in such a manner that the lower surface of the front section of the battery group is located below the lower surface of the rear section of the battery group, the upper surface of the battery group is substantially flat without a level difference, and the front surface of the battery group is substantially flat without a level difference. In other words, the battery group of the plurality of batteries 40 includes the front section composed of upper and lower parts and the rear section which is equal in vertical dimension to the upper part of the front section. This makes it possible to prevent an increase in the dimension of the whole of the batteries 40 in the rightward and leftward direction while increasing the capacity of the whole of the batteries 40.

When viewed from a front, the battery group has a T shape and is symmetric in the vehicle width direction. The plurality of batteries 40 are aligned in such a manner that the upper part of the front section of the battery group has a larger width than the lower part of the front section of the battery group. In this structure, the upper part of the front section of the battery group is formed with a lateral protruding section protruding to both sides in the vehicle width direction when viewed from the lower part of the front section. The plurality of batteries 40 are aligned in such a manner that the lower surface of the lateral protruding section is substantially coplanar with the lower surface of the rear section of the battery group.

When viewed from above, the battery group has a T shape and is symmetric in the vehicle width direction. The plurality of batteries 40 are aligned in such a manner that the upper part of the front section of the battery group has a larger width than the rear section of the battery group.

The specific example of the alignment of the plurality of batteries 40 will now be described. In the upper part of the front section, the larger batteries are placed such that their long sides correspond with the rightward and leftward direction. In the lower part of the front section, the smaller battery is placed such that its long side corresponds with the rightward and leftward direction. In the rear section, the smaller battery is placed such that its long side corresponds with the forward and rearward direction. The layout in which one battery is included in the vertical direction in each of the upper part of the front section, the lower part of the front section, and the rear section is merely exemplary, and a plurality of batteries may be stacked together in the vertical direction in each of the upper part of the front section, the lower part of the front section, and the rear section. Also, the layout in which two batteries are included in the forward and rearward direction in the upper part of the front section and one battery is included in the forward and rearward direction in each of the lower part of the front section and the rear section is merely exemplary. Thus, the number of batteries aligned in the forward and rearward direction in each of the sections may be suitably changed.

The battery group is accommodated into the middle case 21 through the above-described upper end opening in a state in which the upper case 22 is detached from the middle case 21. Thereby, the lower part of the front section is accommodated into the lower case 23 through the lower end opening 32c. Then, the lower surface of the lateral protruding section of the upper part of the front section, and the lower surface of the rear section which is coplanar with the lower surface of the lateral protruding section are placed on the inner bottom surface of the middle case 21. In other words, a portion of the battery group, which is other than the lower part of the front section, is placed on the upper surface of the reinforcement frame 32, and the left end portion and right end portion of this portion of the battery group are placed on the pair of side members 101, 102, respectively. In other words, the reinforcement frame 32 has in an upper surface thereof, a battery placement surface on which the battery group is placed. Since the lateral protruding section is configured such that the lower part of the front section has a smaller width than the upper part of the front section, as described above, the lower part of the front section can pass through the lower end opening 32c surrounded by the reinforcement frame 32 and can be accommodated into the lower case 23, while supporting the batteries 40 of the upper part of the front section with the reinforcement frame 32.

The plurality of batteries 40 are integrated by the casing 41 as the assembly. In the present embodiment, the lower surface of the lower part of the front section is located above the inner bottom surface of the lower case 23 with a gap formed therebetween. In this structure, all of the plurality of batteries 40 of the battery group are supported by the reinforcement frame 32 in the state in which the lower part of the front section is placed below the reinforcement frame 32 via the lower end opening 32c.

After the battery group is accommodated into the middle case 21 and the lower case 23 as described above, the upper case 22 is attached to the middle case 21 to close the upper end opening of the middle case 21 from above. In this way, the battery space S2 is formed by the middle case 21, the upper case 22, and the lower case 23, and the aligned plurality of batteries 40 are accommodated into the battery space S2.

In the present embodiment, all of the plurality of batteries 40 are supported by the reinforcement frame 32. For this reason, the reinforcement frame 32 serves to bear a part of the load of the batteries which the casing body 31 is required to bear. Also, because of the reinforcement frame 32, the upper case 22 and the lower case 23 need not bear the load of the batteries. This makes it possible to reduce the stiffness of the casing body 31, the upper case 22 and the lower case 23 of the battery case 20. Therefore, the materials of these members 31, 22, 23 can be chosen more flexibly. For example, as described above, the upper case 22 and the lower case 23 are allowed to be manufactured using a synthetic resin to reduce their weights. Thus, the weight of the power unit 19 and hence the weight of the entire electric motorcycle 1 can be reduced.

At least one of the plurality of batteries 40 may be supported by the reinforcement frame 32. In this case also, the above advantage can be attained. A part of the plurality of batteries 40 may be supported on the casing body 31. Or, the lower part of the front section may be placed on the inner bottom surface of the lower case 23 so that the lower case 23 can bear a part of the load of the batteries 40.

The rear region of the region of the middle case 21, which is surrounded by the reinforcement frame 32, is closed by the bottom plate 33. In other words, the middle case 21 includes the bottom plate 33 which closes the lower end of the rear region. Therefore, even when the middle case 21 has a tubular shape, the reinforcement frame 32 has a rectangular frame shape, and the lower case 23 is attached to only the front region of the middle case 21, the bottom plate 33 can close the battery space S1. Therefore, it becomes possible to prevent entry of mud or water splashes from below into the casing body 31. The bottom plate 33 is welded to the reinforcement frame 32 in such a manner that the upper surface of the bottom plate 33 is located below the upper surfaces of the side members 101, 102, or the upper surface of the rear cross member 104. Thereby, in the rear region of the middle case 21, the reinforcement frame 32 and the bottom plate 33 cooperate with each other to form a recess 33a of a substantially rectangular shape when viewed from above, which is opened upward. In the state in which the battery group is accommodated in the battery case 20, the lower surface of the upper section of the battery group covers the recess 33a from above, thereby forming a space between the upper section of the battery group and the rear bottom portion of the middle case 21. Cooling air can be flowed through the space formed in the above-described manner, which is an advantage. Since the bottom plate 33 need not have a stiffness to support the batteries, the stiffness and weight of the bottom plate 33 can be reduced.

When the driver seated on the seat 30 (see FIG. 1) puts the soles of the driver's feet on footrests, the driver's legs pass through the outer region of the rear portion of the battery case 20 in the vehicle width direction. As described above, the upper part of the front section of the battery group has a larger width than the rear section of the battery group, and the upper part of the front section and the rear section are accommodated into the middle case 21 and the upper case 22. Correspondingly, each of the middle case 21 and the upper case 22 has a shape in which its rear portion has a smaller width than its front portion. Therefore, the driver can easily grip the battery case 20 with their legs, and the driving stability can be improved.

The rear surface of the upper part of the front section of the battery group is exposed at both sides in the vehicle width direction, when viewed from the rear section. The side surface of the upper part of the front section is continuous with the side surface of the rear section via the rear surface of the upper part of the front section. This rear surface forms a substantially right angle, with each of the side surface of the upper part of the front section and the side surface of the rear section. The rear surface of the upper part of the front section is placed rearward relative to the center cross member 105 of the reinforcement frame 32. The members 101, 102 support on the upper surfaces thereof, the left end portion and right end portion of the lower surface of the upper part of the front section, and the left end portion and right end portion of the lower surface of the rear section. The boundary between the portions of the side members 101, 102, supporting the upper part of the front section, and the portions of the side members 101, 102, supporting the rear section, is located rearward relative to the center cross member 105.

Turning back to FIG. 2, the pair of side members 101, 102 are inclined inward in the vehicle width direction as they extend rearward, from the boundary located rearward relative to the center cross member 105. In this structure, the rear portion of the reinforcement frame 32 has a smaller dimension in the vehicle width direction, as it extends toward the rear end. The rear portion of the casing body 31 of the middle case 21 is welded to the outer edge portions of the side members 101, 102 inclined in this way. The casing body 31 of the middle case 21 has substantially the same shape in a horizontal cross-section at any location in the vertical direction. This allows the driver to easily grip the battery case 20 with their knees as described above.

The side surfaces of the rear section of the battery group extend vertically upward from the upper surfaces of the side members 101, 102, and linearly in the forward and rearward direction. The rear end portions of the side members 101, 102 have a dimension in the vehicle width direction sufficient to support the lower surface of the rear section of the battery group. There is a clearance with a triangular shape when viewed from above, between the middle case 21 and the rear section. This clearance increases in the vehicle width direction as it is closer to the above-described boundary, from which the side members 101, 102 are inclined.

The front end portion of the inclined portion of the right side member 102 has a hollow space 110 formed by cutting out its outer edge portion, inward in the vehicle width direction. A joint 66 (see FIG. 7) used to connect cooling medium pipes 64, 65 is attached to the hollow space 110. The cooling medium pipes 64, 65 (see FIG. 7) connected to the joint 66 run through a relatively larger portion of the clearance. The right side member 102 has a wall portion that is inward in the vehicle width direction relative to the hollow space 110. In this structure, the right front end portion of the bottom surface of the rear section of the battery group can be supported by the reinforcement frame 32, while ensuring a space in which the joint 66 is attached.

A hanger bracket 36 protrudes downward from the center cross member 105. A hanger bracket 39 protrudes downward from the rear cross member 106. The hanger brackets 36, 39 protrude downward from the casing body 31 and are used to mount the motor unit 25 (see FIG. 1).

Turning back to FIG. 1, the motor unit 25 is placed immediately behind the lower case 23 and immediately below the middle case 21. Thus, the motor unit 25 is accommodated in a region surrounded by the battery case 20 of an inverted-L shape. The motor unit 25 is covered by the battery case 20 from a front and from above.

The upper portion of the motor unit 25 is fastened to the hanger brackets 36, 39. Thereby, the motor unit 25 is supported by the reinforcement frame 32 such that the motor unit 25 is suspended from the hanger brackets 36, 39. In this structure, the motor unit 25 can be supported stably in a state in which the motor unit 25 is accommodated within the region surrounded by the battery case 20. In addition, it becomes possible to significantly lessen the load of the motor unit 25 applied to the case members 31, 22, 23 of the battery case 20. The rear portion of the motor unit 25 is covered by the pivot frame 12, and thus the motor unit 25 can be protected by the pivot frame 12. In addition, the rear portion of the motor unit 25 can be supported by the pivot frame 12. In this structure, the pivot frame 12 can also bear a part of the load of the motor unit 25 supported by the reinforcement frame 32. Therefore, the size of the reinforcement frame 32 is not increased excessively.

The motor unit 25 includes a casing 44 (motor case 44), the electric motor 42 accommodated in the casing 44 to generate driving power for moving the vehicle body, a transmission 43 accommodated in the casing 44 to change the speed of a rotational driving power output from the electric motor 42, an oil pan 44*a* attached to the lower portion of the casing 44, and an oil pump 45 which suctions up and discharges oil stored in the oil pan 44*a*. The rotational driving power output from the transmission 43 is transmitted to the rear wheel 3 via a chain 16. The oil may be used to cool at least the inverter 47, or lubricate the electric motor 42 or the transmission 43, as will be described later.

An electric component cover 26 is attached to the upper surface of the battery case 20. The electric component cover 26 and the upper case 22 define a space in which the electric component group 46 is accommodated. The electric component cover 26 is covered by an upper cover 28 which is a dummy tank which looks like a fuel tank of a conventional engine-driven motorcycle. The rear portion of the upper cover 28 is formed with a connector opening 28*a* through which a charging connector 75 is exposed. The connector opening 28*a* is closed by a connector lid member 29. The rear portion of the upper cover 28, corresponding to the connector lid member 29, is smaller in dimension in the vehicle width direction than the center portion of upper cover 28, covering the electric component cover 26. A driver seat 30 supported by the rear frame 13 is placed rearward relative to the upper cover 28. The driver seated on the seat 30 can grip the upper cover 28 with their legs. The upper surface of the battery case 20 is located below the upper end of the seat 30. In this configuration, even when the electric component group 46 including the inverter 47 and the like is placed on the battery case 20, it becomes possible to lessen the amount of the electric component group 46 which protrudes upward from a virtual line connecting the seat 30 to the head pipe 5.

The battery case 20 accommodating the batteries 40 is vertically interposed between the electric component group 46 including the inverter 47 and the motor unit 25 including the electric motor 42. In the electric motorcycle 1 of the present embodiment, the cooling medium pipes extend substantially vertically between the inverter 47 and the motor unit 25. In addition, an electric wire extends substantially vertically between the inverter 47 and the motor unit 25 to supply AC power generated in the inverter 47 to the electric motor 42. At least a portion of the pipes and the electric wire run through the interior of the battery case 20. Also, an electric wire used to supply the DC power stored in the batteries 40 to the inverter 47 is provided in the interior of the battery case 20 and in the interior of the electric component cover 26. The wire module connecting the electric components of the electric component group 46 is provided in the interior of the electric component cover 26.

Figure 7:
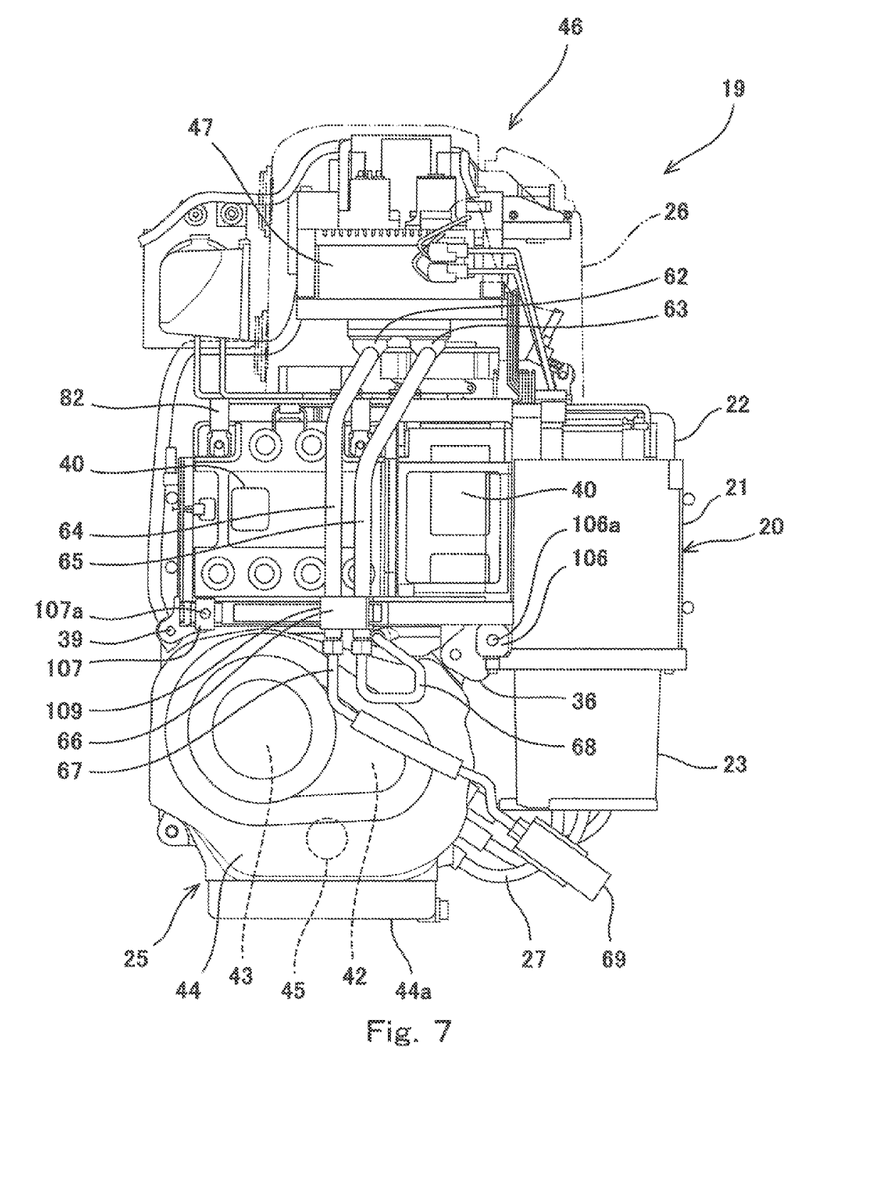
FIG. 7 is a partially cutaway right side view of the power unit of the electric motorcycle of FIG. 1.

FIG. 7 is a partially cutaway right side view of the power unit 19 of the electric motorcycle of FIG. 1. As shown in FIG. 7, in the interior of the case of the inverter 47, cooling medium passages (not shown) through which the oil as the cooling medium flows are provided, and the lower portion of the inverter 47 is provided with a cooling medium inlet 62 and a cooling medium outlet 63 which are in communication with the cooling medium passages. Cooling medium pipes 64, 65 are connected to the cooling medium inlet 62 and the cooling medium outlet 63, respectively. The cooling medium pipes 64, 65 penetrate the upper wall of the upper case 22 and run through the internal space of the battery case 20. The cooling medium pipes 64, 65 are connected to cooling medium pipes 67, 68, respectively, via the joint 66. The cooling medium pipe 67 is connected to the oil cooler 69, while the cooling medium pipe 68 is connected to the casing 44 of the motor unit 25. The oil flows into the casing 44 through the cooling medium pipe 68, cools or lubricates the electric motor 42 or the transmission 43, and then is gathered in the oil pan 44*a*. The oil accumulated in the oil pan 44*a* is suctioned up by the oil pump 45, and then is discharged to the oil cooler 69. After flowing through the oil cooler 69, the oil is guided to the inverter 47 through the cooling medium pipes 67, 64. In this way, the cooling medium pipes 64, 65, 67, 68 are used to circulate the cooling medium to the motor unit 25 and to the inverter 47.

The motor unit 25 including the oil pan 44a and the oil pump 45 is close to the inverter 47 in the forward and rearward direction. This can reduce the length of each of the cooling medium pipes 64, 65, 67, 68 in the forward and rearward direction, and hence a pressure loss. The motor unit 25 and the inverter 47 are vertically spaced apart from each other with the battery case 20 interposed between them. Because of this, most parts of the cooling medium pipes 64, 65, 67, 68 can be accommodated into the battery space S1 and the electric component space S2, the cooling system of the inverter 47 can be protected from an outside world, and the driver can be protected from the cooling system.

The joint 66 is fitted into the hollow space 110, placed inward relative to the casing body 31, and provided on the inner bottom portion of the middle case 21. The lower surface of the joint 66, and the lower surface of the rear region of the middle case 21 (specifically, a portion of the lower surface of the reinforcement frame 32 and the lower surface of the bottom plate 33) define the lower surface of the rear region the middle case 21. The cooling medium pipes 67, 68 are connected to the lower surface of the joint 66, and extend to the corresponding members to which the cooling medium pipes 67, 68 are to be connected as described above. The cooling medium pipes 64, 65 extend upward from the upper surface of the joint 66, run through the upper case 22, run from the battery space S2 into the electric component space S1, and are connected to the inverter 47. The cooling medium pipes 64, 65 are placed within the clearance formed inside of the middle case 21 and the upper case 22 and extend vertically linearly within the clearance.

The rear section of the battery group has a smaller width than the front section of the battery group, and thereby the battery case 20 which can be gripped with the driver's knees more easily is placed between the right and left main frames 11 and mounted thereto. By utilizing a difference in the width in the forward and rearward direction, the clearance is formed inside of the battery case 20. The cooling medium pipes 64, 65 are placed in the clearance. This makes it possible to avoid an increase in the size of the battery case 20, due to the presence of the cooling medium pipes 64, 65 running through the interior of the battery case 20.

Figure 8:
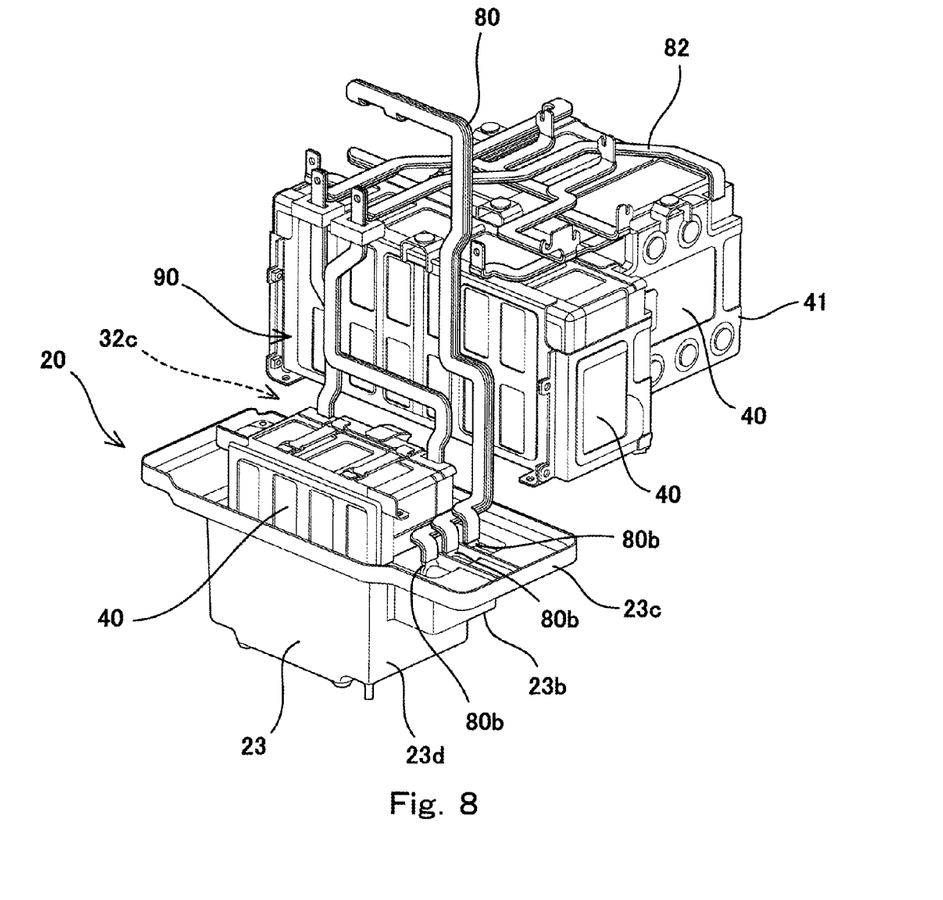
FIG. 8 is a perspective view of major components for explaining bus bar modules in the interior of the battery case of the electric motorcycle of FIG. 1.

FIG. 8 is a perspective view of major components for explaining bus bar modules in the interior of the battery case 20 of the electric motorcycle 1 of FIG. 1. As shown in FIG. 8, the batteries 40 are interconnected in series by a bus bar module 82. The positive terminal and negative terminal of the batteries 40 are exposed in the obverse surface of the battery group. Therefore, by merely placing the bus bar module 82 over the battery group, the terminals of the bus bar module 82 can be electrically connected to the corresponding positive terminal and negative terminal of the batteries 40.

The battery group includes the plurality of batteries 40 which are aligned and integrated. Between adjacent batteries 40, spaces 90 are formed. In FIG. 8, the battery 40 placed at a foremost location, of the batteries 40 of the upper part of the front section, is not shown. The space 90 formed between the battery 40 placed at the foremost location and the battery 40 placed behind and adjacently to the battery 40 placed at the foremost location is exposed. In the present embodiment, the battery group has a two-part structure in the front section. In the two-part structure of the front section, the upper part of the front section is placed inside of the middle case 21 and supported onto the reinforcement frame 32, while the lower part of the front section is placed inside of the lower case 23 and placed below the reinforcement frame 32.

The middle case 21 has the lower end opening 32c to allow the integrated battery group to be accommodated into the battery case 20 of an inverted-L shape when viewed from a side. The front section of the battery group runs through the lower end opening 32c. The bus bar module 82 is required to provide series connection between the batteries 40 accommodated in the lower case 23 and the batteries 40 accommodated in the middle case 21. The bus bar module 82 has a running portion vertically running through the space 90 shown as being exposed in FIG. 8. This running portion runs from the interior of the battery case 20 into the lower case 23 through the lower end opening 32c. The lower end opening 32c is used to accommodate the integrated battery group and to lay out the electric wire (bus bar module 82) connecting the batteries 40. In this manner, the bus bar module 82 can be completely accommodated into the battery space S2 together with the battery group. As a result, the bus bar module 82 can be protected from the outside world, and the driver can be protected from the electric wire.

The bus bar module 82 includes a portion of the electric wire connecting the batteries 40 to the inverter 47. This portion extends upward from the upper surface of the battery group in the state in which the bus bar module 82 is mounted to the battery group, and runs into the electric component cover 26 through a through-hole 22h (see FIG. 4) formed in the upper case 22. With reference to FIG. 4, the upper end of this portion is connected to the end portion of a bus bar module 81 accommodated in the electric component cover 26. The bus bar module 81 vertically extends and its upper end portion is connected to the inverter 47.

The battery case 20 is provided with an electric wire connecting the inverter 47 to the electric motor 42 to supply three-phase AC power from the inverter 47 to the electric motor 42. This electric wire includes a first electric wire portion connected to the inverter 47 and a second electric wire portion connecting the first electric wire portion to the electric motor 42. The first electric wire portion runs through the interior of the battery case 20. In the present embodiment, the first electric wire portion is a three-phase bus bar module 80 including three terminal sections 80b. The three terminal sections 80b are connected to the second electric wire portion, at a terminal accommodating section 23b provided in the lower case 23.

The three-phase bus bar module 80 includes three bus bars stacked together, insulatively bonded together and integrated, each of the three bus bars flowing a current of one of the three phases. Thereby, the three-phase bus bar module 80 can be handled easily. The upper end portion of the three-phase bus bar module 80 is connected to the inverter 47. The three-phase bus bar module 80 runs from the internal space of electric component cover 26 into the internal space of the battery case 20 through an opening 22b (see FIG. 4) formed in the upper case 22. The three-phase bus bar module 80 runs downward in the interior of the battery group through the space 90 of FIG. 8, and into the lower case 23 through the lower end opening 32c.

The front region of the lower end of the middle case 21 is opened, and this opening is closed by the lower case 23. The lower case 23 has a smaller width in the vehicle width direction than the middle case 21. In the present embodiment, the width of the lower case 23 changes at an upper end portion 23c thereof. The upper end portion 23c of the lower case 23 is substantially equal in width to the middle case 21. The upper end portion 23c has a larger width than a remaining portion 23d of the lower case 23. The upper end portion 23c of the lower case 23 protrudes in the vehicle width direction, when viewed from the remaining portion 23d, to form a recess with a small depth. The three bus bars of the three-phase bus bar module 80 run into the recess through the lower end opening 32c. In the recess, the three bus bars extend from a rear to a front, and their extension amounts are slightly different from each other. The three bus bars are bent at their front end portions and extend downward. The lower end portions of the three bus bars are the terminal sections 80b. The terminal accommodating section 23b protrudes from the side surface of the remaining portion 23d of the lower case 23 and is opened in the recess of the upper end portion 23c. The three terminal sections 80b run from the recess into the terminal accommodating section 23b and are accommodated therein.

As shown in FIG. 1, as the second electric wire portion of the present embodiment, three electric cables 27 are used. One end portion of each of the three electric cables 27 is connected to the three terminal sections (not shown in FIG. 1) inside of the terminal accommodating section 23b, while the other end portion of each of the three electric cables 27 is connected to the motor case 44 accommodating the electric motor 42. The three electric cables 27 are placed outside of the battery case 20 and outside of the motor unit 25. The lower case 23 covers the electric motor 42 from a front. The electric motor 42 is close to the lower case 23 in the forward and rearward direction and in the vertical direction. This can reduce the length of the three electric cables 27. Therefore, cables with a large diameter do not substantially occupy the external appearance, and hence the external appearance of the electric motorcycle 1 can be improved. In addition, a cover member for covering the electric cables 27 can be made less in amount than that for covering the cables with a large diameter. Therefore, it becomes possible to manufacture the electric wire connecting the inverter 47 to the electric motor 42, at a low cost.

As described above, the inverter 47 is placed above the battery case 20, and the electric motor 42 is placed below the battery case 20. In other words, the inverter 47 and the electric motor 42 are placed to vertically interpose the battery case 20 between them and the inverter 47 is close to the electric motor 42 in the forward and rearward direction. In this structure, the first electric wire portion (three-phase bus bar module 80) can be extended substantially linearly in the vertical direction, while reducing the length in the forward and rearward direction.

The battery case 20, the batteries 40 accommodated in the battery case 20, the electric component cover 26, and the electric component group 46 accommodated inside of the electric component cover 26 can be handled as an integrated sub-assembly. The first electric wire portion is accommodated into the electric component cover 26 and the battery case 20 and is connected to the inverter 47 as one of the electric components of the electric component group 46. Therefore, the first electric wire portion may be regarded as one of the constituents of the sub-assembly. The dimension of the first electric wire portion is allowed to be controlled with a high accuracy. The first electric wire portion need not be so flexible. For this reason, the first electric wire portion may be constituted by a metal plate with a high heat radiation property and a high conduction property, like the three-phase bus bar module 80. In contrast, as the second electric wire portion, the electric cables 27 having a higher flexibility are used. The electric cables 27 are capable of absorbing a mounting error between the battery case 20 and the motor unit 25. Also, the wiring operation of the electric cables 27 can be easily performed.

As described above, in accordance with the present embodiment, since the battery case 20 comprises the reinforcement frame 32, the vehicle body frame 10 and the case members 31, 22, 23 can be simplified in structure and reduced in weight. The battery case 20 is placed between the pair of right and left main frames 11. The reinforcement frame 32 includes the pair of right and left side members 102, 101. The right and left fastening units 106, 107 are mounted to the right and left side members 102, 101. The battery case 20 (hence the power unit 19) is supported on and fastened to the vehicle body frame 10 in such a manner that the pair of right and left side members 102, 101 are fastened to the right and left main frames 11, with the fastening members 108, 109, by using the right and left fastening units 106, 107. This allows the battery case 20 to be stably supported on the vehicle body frame 10 including the right and left main frames 11.

The main frames 11 are placed between the front wheel 2 and the rear wheel 3. Therefore, the battery case 20 is placed in the same manner. The reinforcement frame 32 extends in the forward and rearward direction. The pair of right and left side members 102, 101 are fastened to the right and left main frames 11, respectively, by using the front fastening units 106 and the rear fastening units 107, which are spaced apart in the forward and rearward direction. This allows the reinforcement frame 32 to sufficiently increase the stiffness of the portions of the main frames 11 (in the present embodiment, the lower main frames 11b) extending in the forward and rearward direction.

The right and left side members 102, 101 are coupled to each other by the plurality of cross members 103 to 105. This can increase the stiffness of the whole reinforcement frame 32. Therefore, the battery case 20 can be supported on the vehicle body frame 10 more stably, and the reinforcement frame 32 can support the batteries more stably. The front fastening units 106 are fastened to the center cross member 105. The right and left rear fastening units 107 are placed to overlap with the rear cross member 104 when viewed from a side. The portions of the reinforcement frame 32 which are fastened to the vehicle body frame 10 are coupled to each other in the rightward and leftward direction via the members which can increase the stiffness of the reinforcement frame 32. Thereby, the battery case 20 can be supported on the vehicle body frame 10 more stably. The motor unit 25 is suspended from the reinforcement frame 32 by the hanger brackets 36, 39 which are fastened to the center cross member 105 and the rear cross member 104, respectively. In this structure, the motor unit 25 can also be supported by the reinforcement frame 32 more stably.

The reinforcement frame 32 is made of the same kind of metal as that of the casing body 31 of the middle case 21 and integrated with the casing body 31 by welding. The material of the reinforcement frame 32 and the material of the casing body 31 are electrically conductive materials. The reinforcement frame 32 and the casing body 31 are set to an electric potential equal to that of the ground voltage of the batteries 40. By merely electrically connecting the negative terminal of the batteries 40 to the reinforcement frame 32 or the casing body 31, the ground connection of the batteries 40 can be realized. In particular, in the present embodiment, the batteries 40 are supported by the reinforcement frame 32 in such a manner that the batteries 40 are supported on the upper surfaces of the pair of side members 101, 102 from below. Therefore, a physical distance between the batteries 40 and the reinforcement frame 32 is short, and the ground connection of the batteries 40 can be realized easily.

The upper case 22 and the lower case 23 are made of a synthetic resin. This can reduce the weight of the battery case 20. This material may be used because the stiffness required for the case members 22, 23 of the battery case 20 to support the batteries 40 or the motor unit 25 can be reduced, as described above. The upper case 22 has a smaller height than the middle case 21 and has a cover shape closing the upper end opening of the middle case 21. By detaching the upper case 22 from the middle case 21, maintenance for the devices and members (the battery group, the cooling medium pipes, etc.) accommodated in the battery case 20 can be carried out. Since the upper case 22 can be reduced in weight, maintenance operations can be carried out easily.

A part of the battery group is placed above the reinforcement frame 32, and the motor unit 25 is placed below the reinforcement frame 32. The reinforcement frame 32 is placed inside of the casing body 31. In this structure, the stiffness of the bottom plate 33 can be reduced. In the present embodiment, the plurality of batteries 40 are fastened to the casing 41 made of metal. Thereby, the casing 41 can support a portion of the batteries 40 which is not located immediately above the reinforcement frame 32. In this structure, the stiffness of the bottom plate 33 can also be reduced. Preferably, the front rear, right, and left portions of the battery group fastened to the casing 41 are supported by the reinforcement frame 32. In other words, the front end portion of the lower surface of the upper part of the front section of the battery group may be supported on the upper surface of the front cross member 103, or the rear end portion of the lower surface of the rear section of the battery group may be supported on the upper surface of the rear cross member 104.

The reinforcement frame 32 is unitarily fastened to the casing body 31. The casing body 31 integrated with the reinforcement frame 32 and the bottom plate 33 is mounted to the main frames 11. In this mounting, the motor unit can be preliminarily mounted to the hanger brackets of the reinforcement frame 32. In this way, the motor unit 25 can be included in the sub-assembly including the battery case 20 and the battery group accommodated in the battery case 20. This allows the power unit 19 to be mounted to the vehicle body more easily. Of course, this sub-assembly may include the electric component cover 26, the electric component group 46 accommodated in the electric component cover 26, and the charging connector 75 attached to the upper case 22.

The reinforcement frame 32 is placed above the pivot shaft 15a of the swing arm 15. In this structure, the output shaft of the electric motor 42 or the output shaft of the transmission 43 can be located close to the pivot shaft 15a in the vertical direction. The battery case 20 includes in its front region, the lower case 23 protruding downward. The batteries 40 are also accommodated in the lower case 23. Because of this, the motor unit can be located as low as the pivot shaft 15a and the center of gravity of the batteries 40 can be located as low as possible. Therefore, the center of gravity of the whole electric motorcycle 1 can be lowered.

The present invention is not limited to the above-described embodiment. The above-described configuration may be changed, added to, or deleted from, within a scope of the spirit of the present invention. For example, the front section of the battery group need not have the two-part structure, and the lower part of the front section of the battery group and the lower case may be omitted. In this case, the reinforcement frame may be altered to surround the outer region of the casing body. The casing body 31 of the middle case 21 and the bottom plate 33 need not be made of the same kind of metal as that of the reinforcement frame 32. For example, the casing body 31 of the middle case 21 and the bottom plate 33 may be made of a synthetic resin. Although the reinforcement frame 32 is provided inside of the casing body 31 to define the inner bottom portion of the middle case 21, the reinforcement frame 32 may be provided outside of the casing body 31, and define the external appearance of the battery case 20 when viewed from a side. The outer edge of the casing body 31 of the middle case 21 may be different in shape from the outer edge of the reinforcement frame 32. In this case, the outer edges of one of the casing body 31 of the middle case 21 and the reinforcement frame 32 may protrude outward farther than the outer edges of the other of the casing body 31 and the reinforcement frame 32. In a case where the outer edges of the reinforcement frame 32 protrude farther, the casing body 31 can be protected. Although the electric motorcycle 1 has been exemplarily described as an example of the electric vehicle, the present invention is also applicable to other electric vehicles, for example, an electric three-wheeled vehicle or an electric four-wheeled vehicle.

INDUSTRIAL APPLICABILITY

As described above, the electric vehicle of the present invention can attain an advantage that it becomes possible to stably support the batteries with a heavy weight while allowing the vehicle body to have a simplified structure, and is effectively applicable to the electric vehicle such as the electric motorcycle which can attain this advantage.

REFERENCE CHARACTER LIST 1 electric motorcycle
2 front wheel
3 rear wheel
5 head pipe
10 vehicle body frame
11 main frame
11a upper main frame
11b lower main frame
20 battery case
21 middle case
32 reinforcement frame
36, 39 hanger brackets
40 battery
42 electric motor
44 casing
101, 102 side member
103 to 105 cross member
106, 107 fastening unit
108, 109 fastening member
S2 battery space

The invention claimed is:

1. An electric vehicle comprising:
a vehicle body including a head pipe supporting a steering shaft, and a main frame extending rearward from the head pipe;
an electric motor which generates driving power for driving a wheel; and
a battery case accommodating a plurality of batteries storing DC power to be supplied to the electric motor, in a battery space in an interior of the battery case,
wherein the battery case includes a middle case, an upper case attached to the middle case to close an upper end opening of the middle case, and a lower case attached to the middle case to close a lower end opening of the middle case, and the middle case includes a casing body, and a reinforcement frame provided on the casing body to reinforce the main frame, and wherein the reinforcement frame is integrated with the casing body and fastened to the main frame by a fastening member, and the reinforcement frame and the casing body which are integrated are detachably mounted to the main frame.

2. The electric vehicle according to claim 1,
wherein the reinforcement frame is provided on a bottom portion of the battery case, and
wherein at least one of the plurality of batteries is supported by the reinforcement frame.

3. The electric vehicle according to claim 1,
wherein the battery case is placed between a front wheel and a rear wheel in a forward and rearward direction, and
wherein the reinforcement frame extends in a forward and rearward direction, and a front end portion and a rear end portion of the reinforcement frame are connected to the main frame.

4. The electric vehicle according to claim 1,
wherein the main frame is divided into right and left main frames extending from the head pipe, and
wherein the reinforcement frame includes a pair of side members connected to the right and left main frames, respectively.

5. The electric vehicle according to claim 1,
wherein the casing body includes a contact section configured to contact the reinforcement frame,
wherein the contact section and the reinforcement frame are made of metal.

6. The electric vehicle according to claim 5,
wherein a portion of the casing body which is different from the contact section is made of a resin.

7. The electric vehicle according to claim 1,
wherein the casing body includes a contact section configured to contact the reinforcement frame,
wherein the contact section and the reinforcement frame are made of electrically conductive materials, and
wherein the contact section and the reinforcement frame are set to an electric potential equal to an electric potential of a ground voltage of the plurality of batteries.

8. The electric vehicle according to claim 1, comprising:
a motor case accommodating the electric motor,
wherein the reinforcement frame is provided with a hanger bracket protruding downward, and
wherein the motor case is suspended from the hanger bracket.

9. The electric vehicle according to claim 1,
wherein the reinforcement frame is constituted by a member of a hollow shape.

10. The electric vehicle according to claim 1,
wherein the reinforcement frame has a rectangular frame shape.

11. The electric vehicle according to claim 10,
wherein the reinforcement frame has an opening extending vertically.

12. The electric vehicle according to claim 1,
wherein the electric motor is supported by the reinforcement frame, and
wherein the electric motor and the reinforcement frame are detachably mounted to the main frame.

13. An electric vehicle comprising:
a vehicle body including a head pipe supporting a steering shaft, and a main frame extending rearward from the head pipe;
an electric motor which generates a driving power for driving a wheel; and
a battery case accommodating a plurality of batteries storing DC power to be supplied to the electric motor, in a battery space in an interior of the battery case,
wherein the battery case includes a casing body, and a reinforcement frame provided on the casing body to reinforce the main frame,
wherein the reinforcement frame is fastened to the main frame by a fastening member,
wherein the main frame includes a pair of right and left main frames extending rearward from the head pipe, and
wherein the reinforcement frame includes a pair of side members connected to the pair of right and left main frames, respectively, and a cross member coupling the pair of side members to each other in a rightward and leftward direction.

* * * * *